(12) United States Patent
Murray et al.

(10) Patent No.: US 11,182,500 B2
(45) Date of Patent: Nov. 23, 2021

(54) SENSITIVE DATA MANAGEMENT

(71) Applicant: International Business Machines Corporation, Armonk, NY (US)

(72) Inventors: Kathleen Bridget Murray, Ballymore Eustace (IE); John McEvoy, Trim (IE); Mark McCarville, Ballymore Eustace (IE); Jill Browne, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 16/421,233

(22) Filed: May 23, 2019

(65) Prior Publication Data

US 2020/0372172 A1 Nov. 26, 2020

(51) Int. Cl.
*G06F 17/00* (2019.01)
*G06F 21/62* (2013.01)
*G06F 16/958* (2019.01)
*G06F 16/955* (2019.01)

(52) U.S. Cl.
CPC ........ *G06F 21/6245* (2013.01); *G06F 16/958* (2019.01); *G06F 16/9566* (2019.01)

(58) Field of Classification Search
CPC .............. G06F 21/6245; G06F 16/958; G06F 16/9566; G06F 40/143
USPC ......................................... 715/234, 200, 26
See application file for complete search history.

(56) References Cited

U.S. PATENT DOCUMENTS

| | | | |
|---|---|---|---|
| 7,660,779 B2 * | 2/2010 | Goodman | G06F 40/174 706/48 |
| 8,738,604 B2 * | 5/2014 | Devarajan | G06F 16/90344 707/709 |
| 9,325,715 B1 | 4/2016 | Chereshnev | |
| 9,852,309 B2 * | 12/2017 | Luria | G06F 21/6245 |
| 9,934,542 B2 | 4/2018 | Singh | |

(Continued)

FOREIGN PATENT DOCUMENTS

| | | |
|---|---|---|
| CN | 106789964 A | 5/2017 |
| CN | 107480553 A | 12/2017 |

OTHER PUBLICATIONS

International Search Report and Written Opinion for International Application No. PCT/IB2020/054330, National Intellectual Property Adminislialion, Beijing, China, dated Aug. 17, 2020, 9 pages.

*Primary Examiner* — Manglesh M Patel
(74) *Attorney, Agent, or Firm* — VanLeeuwen & VanLeeuwen; Jeffrey S. LaBaw

(57) ABSTRACT

An approach is provided that detects transmission of sensitive data fields from a user device to an online site. The approach determines the data types of the sensitive data fields and gathers site information from the online site which are stored in a data store along with the current date. Subsequently, the user can manage the data by displaying site information on a display of the user device. Each record of site information pertains to one of many online sites including the selected online site. The user makes a data management request at the user device pertaining to the selected site information. The approach then responsively transmits a request to the selected online site with the request being based on the received data management request. One example of a request is a deletion request that requests that the online site remove the user's sensitive data from the online site.

20 Claims, 7 Drawing Sheets

(56) References Cited

U.S. PATENT DOCUMENTS

| | | | |
|---|---|---|---|
| 10,044,665 B2 | 8/2018 | Le Jouan | |
| 2007/0061877 A1* | 3/2007 | Sima | H04L 63/20 |
| | | | 726/12 |
| 2007/0266079 A1* | 11/2007 | Criddle | G06Q 10/107 |
| | | | 709/203 |
| 2011/0126290 A1* | 5/2011 | Krishnamurthy | G06F 21/577 |
| | | | 726/26 |
| 2014/0244399 A1 | 8/2014 | Orduna | |
| 2017/0024581 A1 | 1/2017 | Grubel | |
| 2018/0075058 A1 | 3/2018 | Boutnaru | |
| 2018/0246884 A1 | 8/2018 | Bergman | |

* cited by examiner

SENSITIVE DATA MANAGEMENT

BACKGROUND

In today's interconnected world, users often perform personal business and shop on the Internet using many sites and applications and from a variety of mobile and stationary devices. While performing these functions, these users are frequently asked to allow access to personal contacts and other data on their devices or manually entered by the user on one of the devices. This data might also include personal information that is sensitive to the user, such as the user's name, email address, telephone number, date of birth, gender, mailing address, and the like.

With the onset of increased rules including user privacy legislation enacted in some jurisdictions, the onus is often placed on the website administrators to adhere to the rules regarding the use and retention of user's information. User privacy concerns also include concerns regarding whether the user's personal information has been deleted upon request, when the data is no longer needed, or when it expires. Another concern is whether the user's information has been shared with a third party. This problem is even more pertinent in light of routine website security breaches and unlawful sharing of user's information that is regularly reported in the media.

SUMMARY

An approach is provided that detects transmission of sensitive data fields from a user device to an online site. The approach determines the data types of the sensitive data fields and gathers site information from the online site which are stored in a data store along with the current date. Subsequently, the user can manage the data by displaying site information on a display of the user device. Each record of site information pertains to one of many online sites including the selected online site. The user makes a data management request at the user device pertaining to the selected site information. The approach then responsively transmits a request to the selected online site with the request being based on the received data management request. One example of a request is a deletion request that requests that the online site remove the user's sensitive data from the online site.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
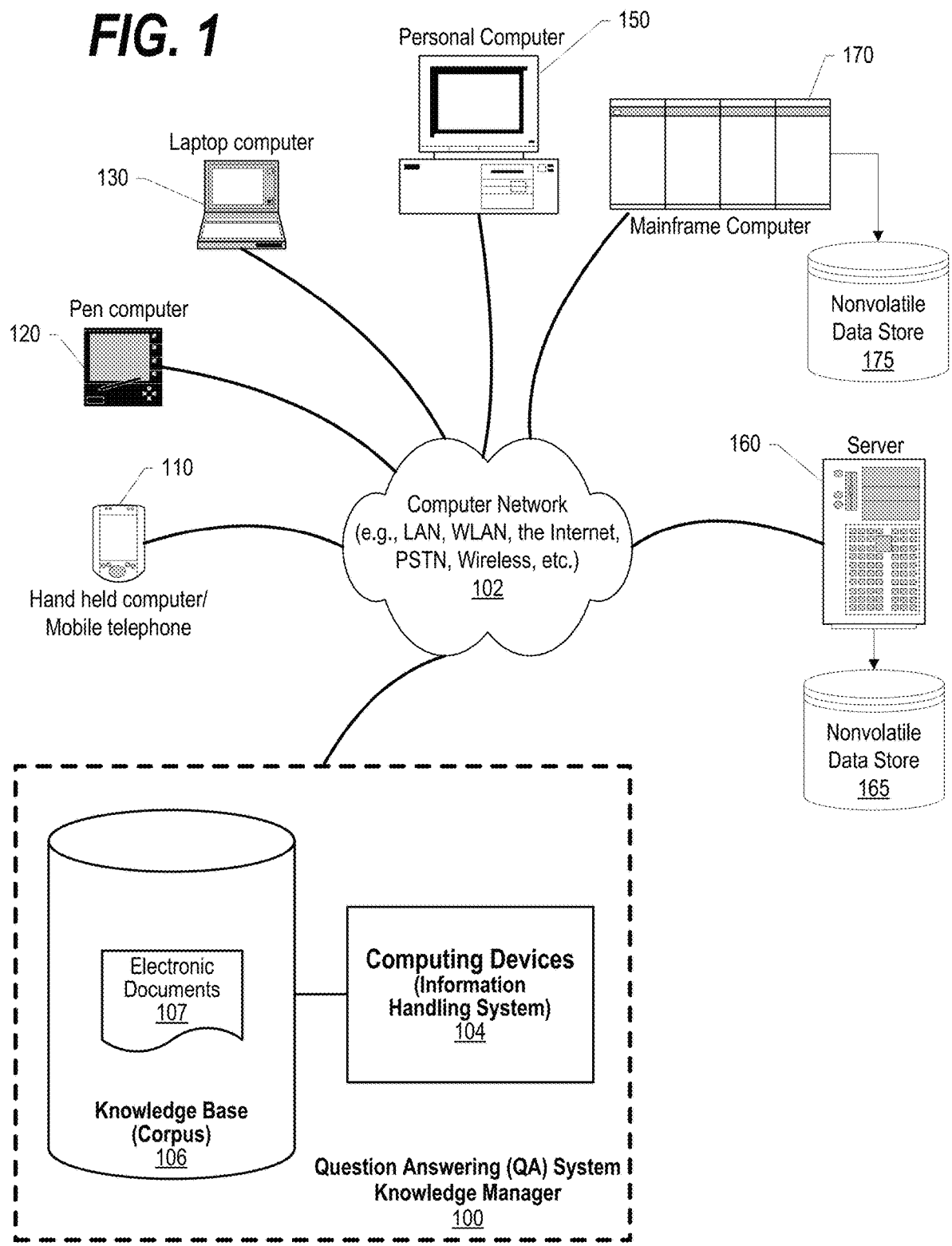
FIG. 1 depicts a network environment that includes a knowledge manager that utilizes a knowledge base.

FIGS. 1-7 describe an approach that automatically registers the type of personal information (PI) a user provides to online sites or applications. As used herein, PI is included in the larger scope of "sensitive data fields." The approach provides a system that stores the data type of personal information entered on any online sites and apps, such as the user's name, date of birth, phone number, email address, mailing address, gender and the like along with information about the site. Information about the site might include the site or company name, the site's web address as well as other information gathered when the system crawls through the site. In addition, the system records the date and time that the user's information was provided to the site. The approach gives the user a history of the sensitive data fields they have provided entered to numerous sites/app/systems and allows them to review, update or retract this data from these sites/apps at their discretion. In this manner, the approach gives the user more control over their own personal data and the use of this data by others.

A system application, or tool, monitors the sites/apps to which a user accesses and records when a user provides sensitive data fields to a site or app. In one embodiment, the system is structured as follows. First, the system listens for a form POST, when a POST is detected the field names and website URL are saved to the database. A new database entry starts a job to process the form fields and save data to the database when transfer of the user's sensitive data fields are detected. If transfer of sensitive data fields is detected, a web crawler accesses the website and retrieves relevant links, cookie policy, terms and conditions etc. found on the website pages. A request is sent to retrieve the text for these web pages. The text from these pages is then processed into a format that can be presented to the end user.

If the user is just viewing a webpage and no forms are submitted, no action is taken by the system. However, if the user loads a webpage and fills out and submits a form possibly containing sensitive data fields, the system detects the POST request from this form. A new entry is then entered into the database for processing. The entry contains the website URL as well as the date the action took place. A job is then kicked off to augment this data with information regarding pertinent rules, laws, and regulations found on the website (e.g., length of time a user's sensitive data fields are retained, restrictions on what entities can access the user's sensitive data fields, etc.).

An entry is placed in a database queue for processing. In one embodiment, the system processes the data using a Natural Language Process (NLP) in order to determine if the form contains sensitive data fields. If no sensitive data fields were submitted no further action is taken. However, if sensitive data fields were submitted, the field names are parsed and stored in the database. A web crawler process is then called to get the data policies for the website or app and the rules, laws, and regulations that the website follows in using the information (e.g., the General Data Protection Regulation (GDPR) framework in the European Union (EU), etc.).

Once sensitive data fields have been detected and the database has been updated the process retrieves the website's cookie policy, the website's data policy and information about the rules, laws, and regulations that the website follows. A web crawler is launched and opens the website. The crawler reads the links of the webpage searching for key terms such as "cookie policy", "gdpr" etc. When a useful link is detected, the link is then saved to the database for the relevant entry. For each link stored in the database, a request is sent to get the webpage text for each link and the text from the page is stored.

The process then extracts the data from the relevant web pages and converts the text on the pages into predefined fields, which can then be presented to the user in a readable format on a user interface (UI). Note: sensitive data fields are not stored by system, only the data types corresponding to the sensitive data fields. For example, the user might enter his or her bank account number on several online forms, each with a different field name. The system records that these sites have receives bank account information (the data type), however the system does not store the actual bank account number in the database.

To view the data stored, the user utilizes a user interface (UI) that might be in the form of a browser extension, or an app. In one embodiment, the user opens a browser plugin or goes to a website to see the data logged to the database (websites information and types of sensitive data fields provided to such websites). In one embodiment, a list of websites is provided and the user selects ("clicks") a site of interest to view the site's URL, the sensitive data fields types provided to the websites, the date that the data was provided, and other relevant information. In addition, the user is also provided a link (e.g. "delete account," etc.) that the user can select to perform a data management request that transmits a request to the website to have the user's sensitive data removed from the website (the data being stored in sensitive data fields). The URL for this link was previously retrieved from the website during the web crawling phase described above. As used herein, a data management request performed from the user's device is a request, often initiated by the user of the device, to transmit a request to the online site to manage the user's sensitive data, such as requesting that the user's account be deleted from the online site, requesting the current status of the user's account (e.g., whether the account is currently "active," etc.), and the like.

In one embodiment, the database is stored in online storage (i.e. in "the cloud," etc.) allowing the user to access their data from any device that is capable of connecting to the Internet. In one embodiment, the system alerts the user via the UI or via email if the system detects that the user's sensitive data fields have been held after a specified time period (e.g., 1 year, etc.). The user can then contact the site if they so wish to review or delete their data.

As well as the data type of sensitive data fields, the system also logs the rules, laws, and regulation details that applied to the website when the user signed up or last logged into the website. These rules, laws, and regulations might include partners of the site or application that their data is shared with, how long the site can keep their data and when it will be deleted, etc. Other data that may not have been obvious to the user will also be shown. For example, any follow on requests by the site to other sites that include the user's personal information, such as the user's current physical location.

In one embodiment, the user will be able to configure the system by adding their own data types, by specifying form field identifiers that may contain sensitive data fields. Also, the user can specify the data types of sensitive data fields with this information being used to assist the system when determining whether a form field has sensitive data fields. The user can also configure the system by notifying the system to ignore certain form fields as they are not deemed to reference sensitive data fields.

As the system will have the expected expiry of the user's sensitive data fields in a website, it provides alerts/notifications (e.g. email, UI) if any expiry dates have elapsed, prompting the user to take action to understand continued usage of data or request deletion. The system can perform data management requests that check for feeds for any security breaches and cross-reference these with the stored websites, again notifying the user if any of their websites were breached. It can also notify users if there are any scams (e.g. phishing emails for bank details) in progress. The user can perform data management requests to have the user's account deleted from the online site and also to request the user's account status.

In one embodiment, the system alerts the user that they are about to submit sensitive data fields based on the field name in a form if it matches a field name associated with types of sensitive data fields previously logged by the system. In one embodiment, the system can provide warnings about sites that have a history of having a data breach. In one embodiment, the system incorporates a 'legacy' feature where the user can indicate a 'Next of Kin' to enable another user to view and keep the history of sensitive data fields submissions that may also relate to them and are thereby equipped with the information they need to remove this data from the public forums. This may be needed if a person passes away or becomes incapacitated.

In one embodiment, the system records information when the website informs the user (e.g., via email, etc.) that the user's sensitive data fields have now been removed as it is no longer needed (e.g. per GDPR rules, etc.). The system can further detect and record account (e.g., sensitive data fields, etc.) deletion from sites/apps, also recording data and date/time of activity. In one embodiment, if the user unsubscribes from a service this action will be recorded in the database. If the user continues to receive unwanted notifications etc., the user can review the registry and see that they had previously unsubscribed allowing them to contact the sender stating that the notification should not have been sent to the user and provide details regarding the user's unsubscribe request. The user can then perform data management requests to have the user's account deleted from the online site and also to request the user's account status.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
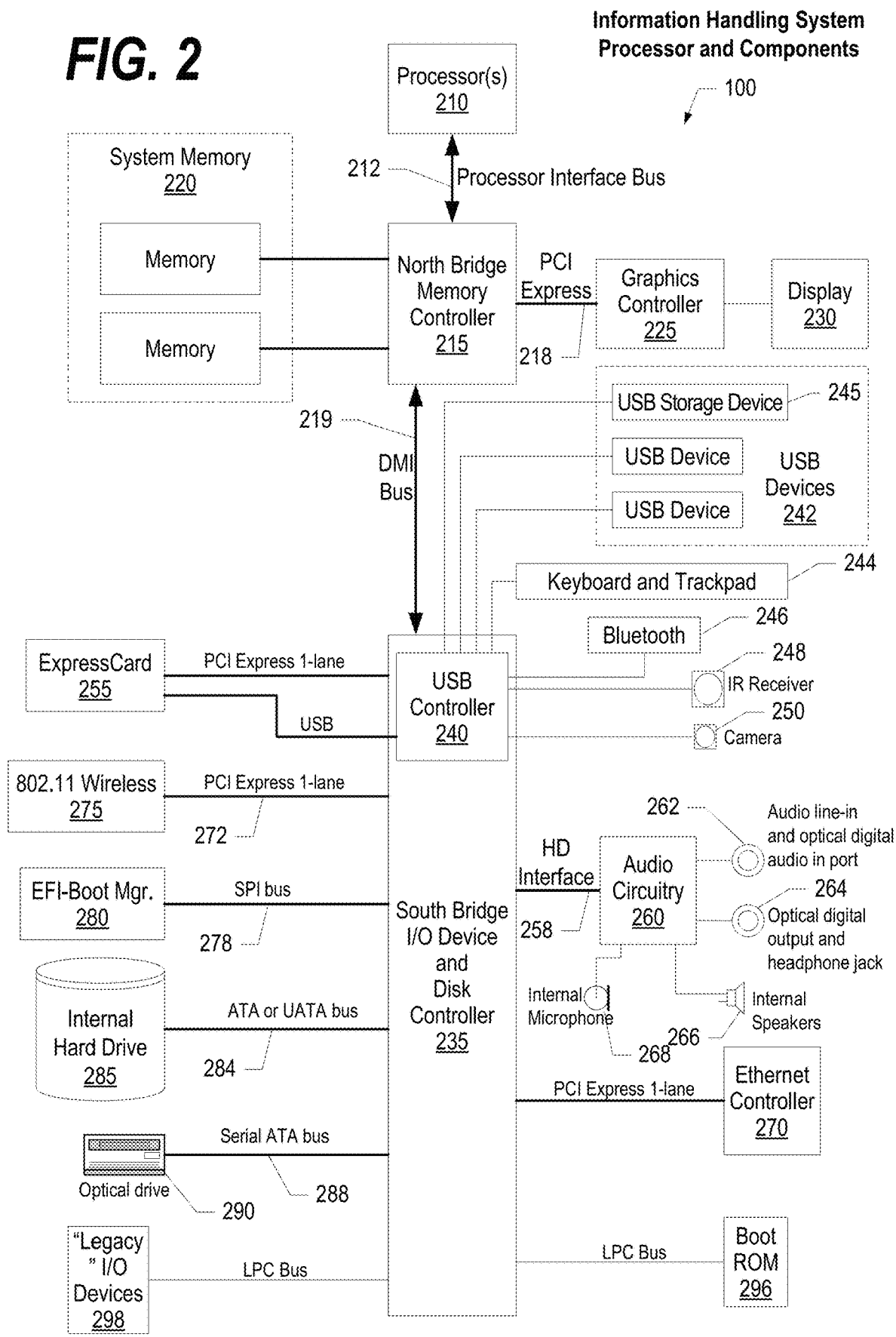
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
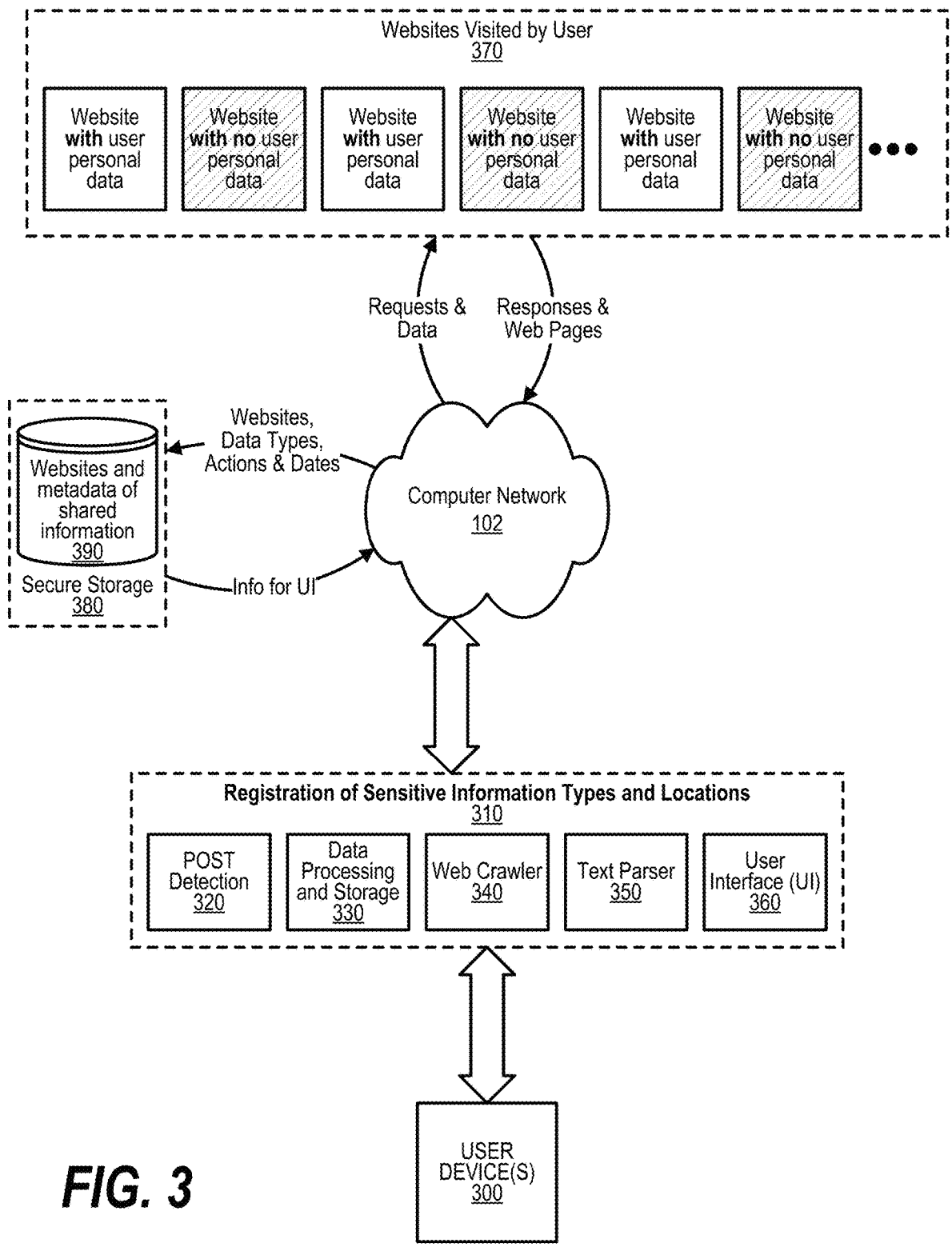
FIG. 3 is a component diagram that shows the various components included in a system that tracks the types of information shared by users with websites and applications.

FIG. 3 is a component diagram that shows the various components included in a system that tracks the types of information shared by users with websites and applications. System 310 registers data types corresponding to sensitive data fields that the user has provided to various websites 370 while using one or more user devices 310.

As shown, system 310 is comprised of a number of processes that work together to register sensitive data types and the network locations where such data types have been provided by the user. These processes include post detection process 320 that detect that the user is providing sensitive data fields to a website. Data processing and storage process 330 analyzes the data fields entered by the user to determine whether the data fields represent sensitive data fields or non-sensitive data fields. Web crawler process 340 crawls through the website where the user's sensitive data is being sent and gathers a set of site information from the website. This site information includes data policies of the website including data retention policies and data sharing policies. In addition, the web crawler process attempts to locate and find a link on the website that the user can use to request account deletion of the user's sensitive data from the website. The policy data gathered from the website and deletion link information (e.g., a URL of the link set up by the website to request deletion of user account information, etc.) is identified from various pages accessible from the website. Text parser process 350 parses the text gathered from the website into a more useful format, such as into predefined fields, that can be stored in a database for future retrieval. Finally, user interface (UI) process 360 provides an interface that can be used to display locations where the user's sensitive information (sensitive data fields) have been provided as well as the site information that was gathered from the website when the user initially provided the user's information to the website. The user interface also provides an interface to allow the user to request that the user's information be removed from the website, in which case the deletion link (e.g., URL, etc.) that was gathered during the web crawling process is utilized to request deletion of the user's sensitive information from the website. The user can utilize UI process 360 to initiate data management requests. These data management requests are performed to transmit a request to the online site to manage the user's sensitive data, such as requesting that the user's account be deleted from the online site, requesting the current status of the user's account (e.g., whether the account is currently "active," etc.), and the like.

Websites visited by the user are shown in container 370 with some of these websites being sites that have been provided with user's sensitive data fields while other visited websites have not received any of the user's sensitive information. Data store 390, such as a database, is used to store the location information of websites where the user has provided his or her sensitive information as well the data types of the personal data fields provided to the website.

Importantly, the system refrains from storing any of the user's actual personal data field information in data store 390. In one embodiment, data store 390 is maintained as network-accessible storage by online storage manager 380 that provides the user with secure access to data store 390 and prevents other entities from accessing data stored in data store 390 by requiring authentication and credentials (e.g., user identifier, password, etc.) to access data store 390. To view and manage data stored in data store 390 that pertains to websites 370 with which the user has supplied sensitive information, the user invokes user interface (UI) process 360 from one of user devices 300 and the UI process, either directly or indirectly, accesses the data stored in data store 380 on behalf of the user by supplying the user-supplied authentication and credentials (e.g., user identifier, password, etc.) needed to access secure storage 380.

Figure 4:
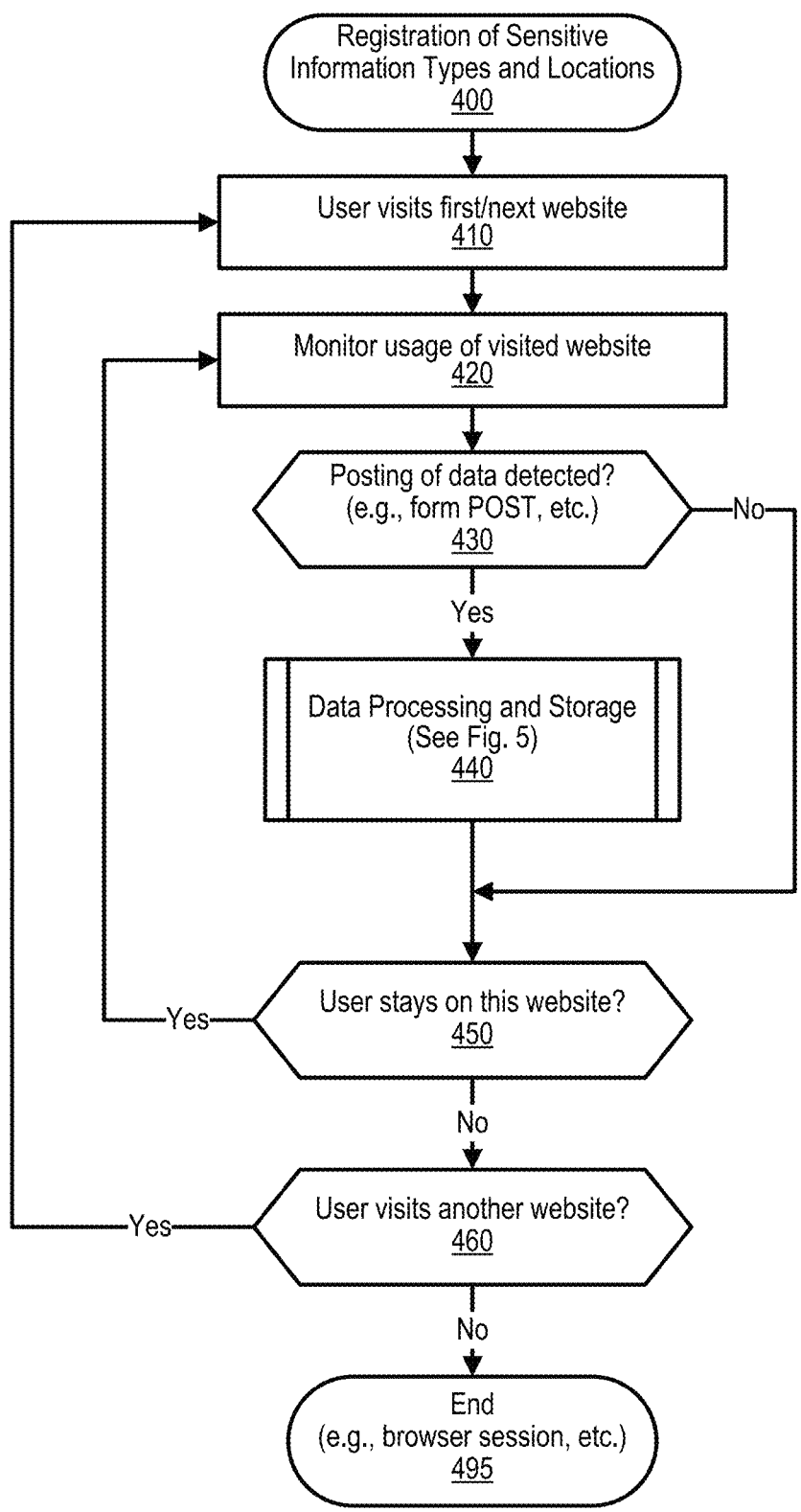
FIG. 4 is a depiction of a flowchart showing the logic used to register sensitive information types and locations where such types are provided.

FIG. 4 is a depiction of a flowchart showing the logic used to register sensitive information types and locations where such types are provided. FIG. 4 processing commences at 400 and shows the steps taken by a process that registers a user's sensitive data fields provided to online sites.

At step 410, the user visits a website. At step 420, the process monitors the user's usage of the visited website. While monitoring, the process detects and determines whether the user is transmitting data to the online site, such as in a form supplied by the site (decision 430). If the user's transmission of data to the online site is detected, then decision 430 branches to the 'yes' branch to further analyze the data being transmitted by performing predefined process 440 which performs a data processing and storage routine (see FIG. 5 and corresponding descriptive text for details). On the other hand, if transmission of data is not detected, then decision 430 branches to the 'no' branch bypassing predefined process 440.

By monitoring the user's online activity, the process determines whether the user remains on this website or moves elsewhere (decision 450). If the user remains on this website, then decision 450 branches to the 'yes' branch which loops back to step 420 to continue monitoring the user's activities on this website. This looping continues until the user's visit to this website terminates, at which point decision 450 branches to the 'no' branch exiting the loop. When the user stops visiting one website, the process determines whether the user is visiting another website or has stopped online activity (decision 460).

If user visits another website, then decision 460 branches to the 'yes' branch which loops back to step 410 to commence monitoring of the user's visit to the next website. This looping continues until the user stops online activity (e.g., closes the web browser application, etc.), at which point decision 460 branches to the 'no' branch exiting the loop. FIG. 4 processing thereafter ends at 495.

Figure 5:
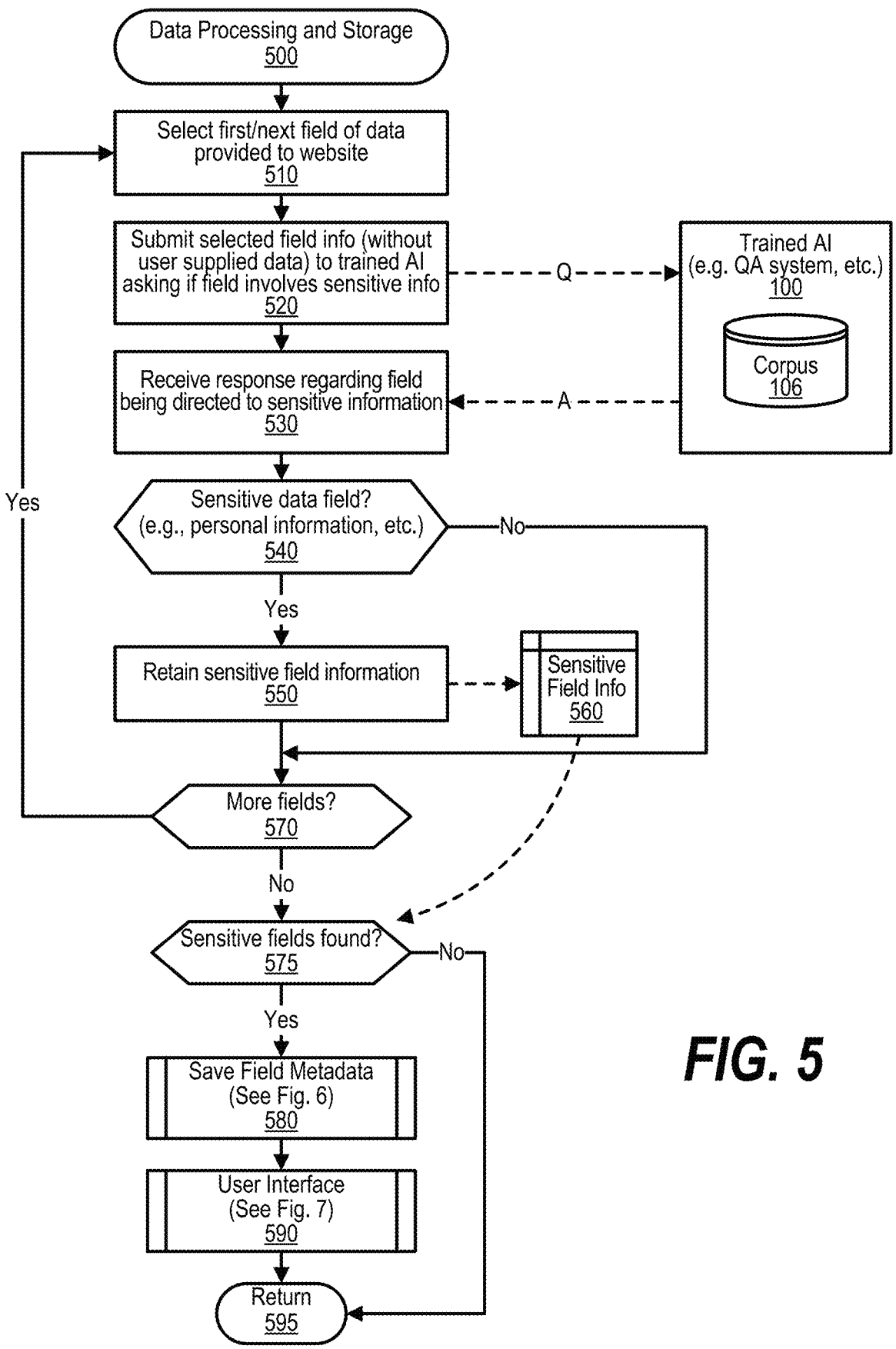
FIG. 5 is a depiction of a flowchart showing the logic used during data processing and storage of sensitive information types and locations.

FIG. 5 is a depiction of a flowchart showing the logic used during data processing and storage of sensitive information types and locations. FIG. 5 processing commences at 500 and shows the steps taken by a process that performs the data processing and storage routine. At step 510, the process selects the first field of data that is being provided (transmitted) to the online site.

At step 520, the process submits the selected field information that is retrieved from the online site (without the user supplied data) to trained artificial intelligence (AI) system, such as QA system 100, asking if data for the data field that is being requested by the online site involves sensitive data. QA system 100 is trained with corpus 106 having numerous training data to identify sensitive data fields (e.g., fields requesting personal information such as the user's name, email address, date of birth, mailing address, telephone number, financial account information, government identity information, gender, etc.). At step 530, the process receives a response from QA system 100 indicating whether the field is to be supplied with user sensitive information, making the field a sensitive data field.

Based on the response from QA system 100, the process determines whether the data field is a sensitive data field (decision 540). If the data field is a sensitive data field, then decision 540 branches to the 'yes' branch whereupon, at step 550, the process retains the sensitive data field information in memory area 560. On the other hand, if the data field is not a sensitive data field, then decision 540 branches to the 'no' branch bypassing step 550. The process determines whether there are more data fields of data being transmitted from the user's device to the online site (decision 570). If there are more data fields of data being transmitted, then decision 570 branches to the 'yes' branch which loops back to step 510 to select and process the next field of data as described above. This looping continues until there are no more data fields of data being transmitted, at which point decision 570 branches to the 'no' branch exiting the loop.

The process determines whether any sensitive data fields were found in the transmission by checking memory area 560 (decision 575). If sensitive data fields were found, then decision 575 branches to the 'yes' branch to perform predefined processes 580 and 590 to update the database used to manage the user's sensitive data fields provided to online sites. On the other hand, if sensitive data fields were not found, then decision 575 branches to the 'no' branch bypassing predefined processes 580 and 590. If sensitive data fields were detected as being transmitted, then predefined processes 580 and 590 are performed. At predefined process 580, the process performs the Save Field Metadata routine (see FIG. 6 and corresponding text for processing details), and at predefined process 590, the process performs the User Interface routine (see FIG. 7 and corresponding text for processing details). FIG. 5 processing thereafter returns to the calling routine (see FIG. 4) at 595.

Figure 6:
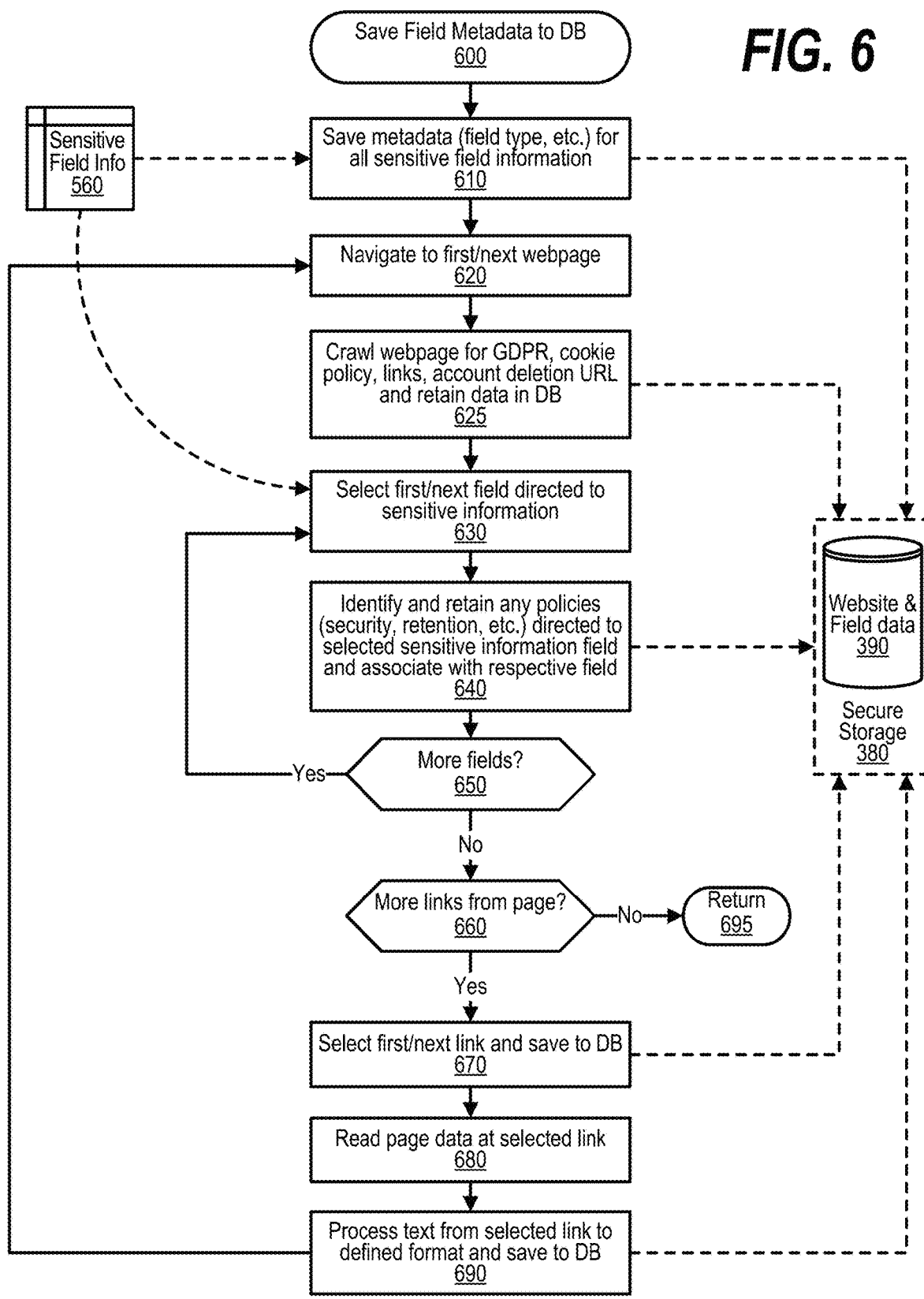
FIG. 6 is a depiction of a flowchart showing the logic used to retain field metadata to a database.

FIG. 6 is a depiction of a flowchart showing the logic used to retain field metadata to a database. FIG. 6 processing commences at 600 and shows the steps taken by a process that saves sensitive data field metadata to a data store, such as a database. At step 610, the process saves metadata for all sensitive data fields (field type, etc.) that was detected in the transmission from the user's device to the online site. The data is saved to data store 390, such as an network accessible database with access controlled by online secure storage process 380.

At step 620, the process navigates to the webpage to commence "crawling" through the website to gather information from the website. At step 625, the process crawls the current webpage for rules, laws, and regulation (e.g., GDPR, etc.) information adhered or otherwise followed by the website, the website's cookie policy, the website's links, any account deletion link (e.g., URL, etc.) found on the website, and retains all of this data in data store 390.

At step 630, the process selects the first sensitive data field from memory area 560. At step 640, the process identifies and retains any policies (e.g., security, retention, sharing, etc.) directed to the selected sensitive data field and associates these policies with the selected sensitive data field. The process determines whether there are more sensitive data fields to process (decision 650). If there are more sensitive data fields to process, then decision 650 branches to the 'yes' branch which loops back to step 630 to select and process the next sensitive data field to gather any field-specific policies regarding this field as described above. This looping continues until there are no more sensitive data fields to process, at which point decision 650 branches to the 'no' branch exiting the loop.

The process determines as to whether there are more links from the current webpage (decision 660). If there are more links from the current page, then decision 660 branches to the 'yes' branch which performs steps 670, 680, and 690 to select and crawl through the next link. This looping continues until all links have been processed, at which point decision 660 branches to the 'no' branch exiting the loop and processing returns to the calling routine (see FIG. 5) at 695.

To process a link, steps 670, 680, and 690 are performed. At step 670, the process selects the first link and saves the link to data store 390. At step 680, the process reads the page of data from the selected link. At step 690, the process processes the text read from selected link to defined format (e.g., into predefined fields, etc.) and save the data (now in the defined format) to data store 390. Processing then loops back to determine whether all of the links have been processed. This looping continues until all of the links are processed, at which point processing returns to the calling routine at 695.

Figure 7:
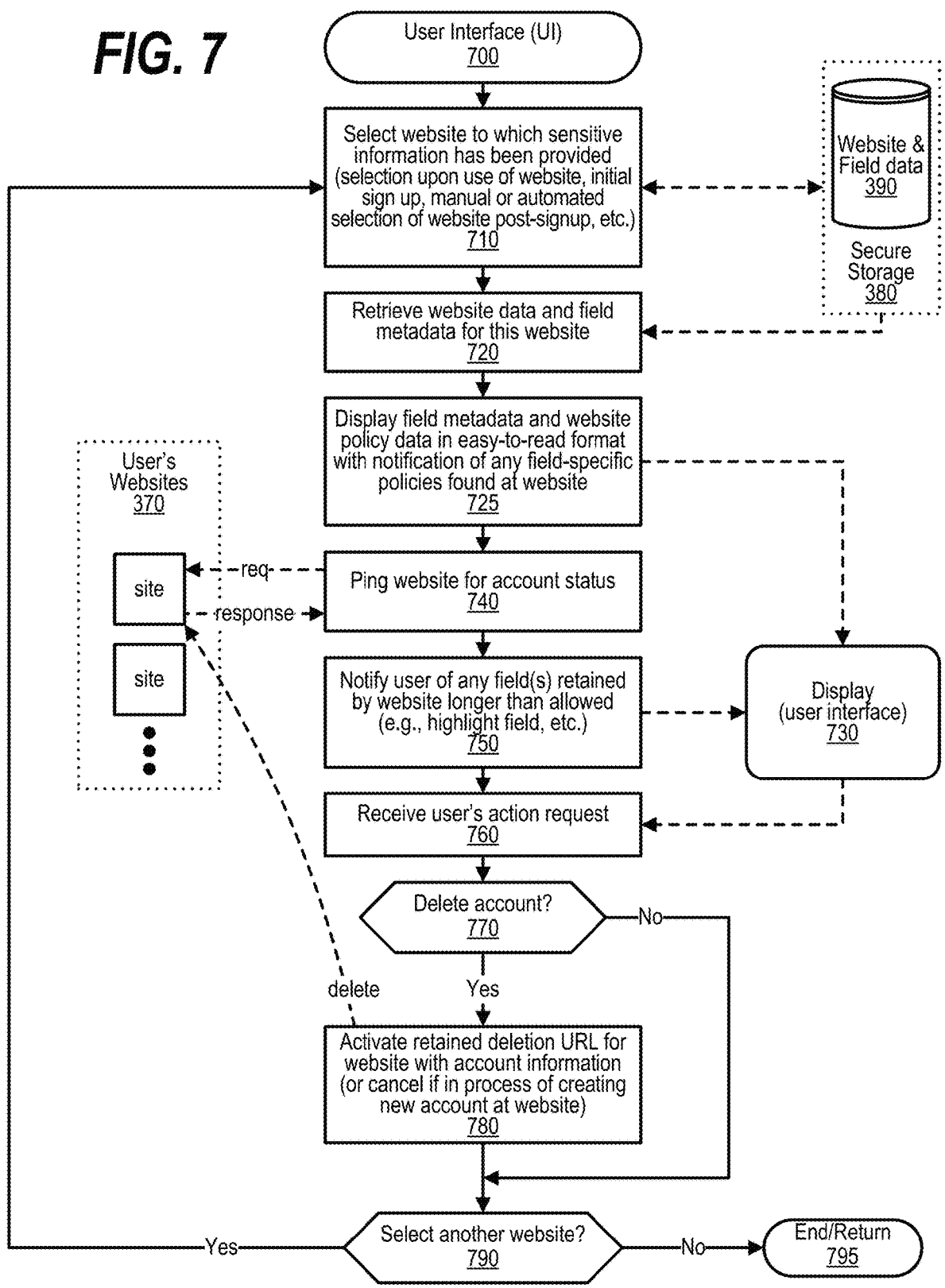
FIG. 7 is a depiction of a flowchart showing the logic used to provide a user interface (UI) that displays sensitive information types and storage locations to a user and allows the user to request deletion of the user's data from a selected online location.

FIG. 7 is a depiction of a flowchart showing the logic used to provide a user interface (UI) that displays sensitive information types and storage locations to a user and allows the user to request deletion of the user's data from a selected online location. FIG. 7 processing commences at 700 and shows the steps taken by a process that user Interface (UI). At step 710, the user selects a website from data store 390 from a list of displayed websites to which the user's sensitive information (sensitive data fields) have been provided. This selection may be performed upon the user's use of website, the user's initial transmission of the sensitive data fields to the site, manually upon request of the user, or via an automated selection of the website post-signup, such as after a certain period of time has elapsed since the user provided the sensitive data fields to the website (e.g., after one year, etc.).

At step 720, the process retrieves the website data and the sensitive data field metadata corresponding to this website from data store 390. At step 725, the process displays the sensitive data field metadata and website policy data in an easy-to-read format with notification of any field-specific policies found at website. This data is displayed on device display 730. In one embodiment, at step 740, the process "pings" the website for account status (e.g., to determine if an account is active after the user has requested that the account be deleted, etc.). The website responds with the account status information. At step 750, using display 730, the process notifies the user of any sensitive data fields that have been retained by the website for a longer time period than allowed (e.g., by highlighting such fields, etc.).

At step 760, the process receives the user's action request. The process determines as to whether the user has requested to delete the user's account from the website (decision 770). If the user has requested to delete the user's account from the website, then decision 770 branches to the 'yes' branch whereupon, at step 780, the process activates the retained deletion link (e.g., URL, etc.) that was previously gathered from the website and provides the user's website account information (or cancels the transmission of the sensitive data fields if the user is currently in the process of creating a new account at the website). The activation of this deletion link causes a deletion request to be transmitted from the user's device to the selected website prompting the website to delete the user's account information and the sensitive data field data provided by the user when the user opened and used the account. On the other hand, if the user has not requested to delete the user's account from the website, then decision 770 branches to the 'no' branch bypassing step 780.

The process determines as to whether the user has selected another website from the list of websites stored in data store 390 to which the user has provided sensitive data fields (decision 790). If the user selects another website, then decision 790 branches to the 'yes' branch which loops back to step 710 to select, display, and process the sensitive data fields that have been provided to the website along with the websites policy information as discussed above. This looping continues until no more websites are selected, at which point decision 790 branches to the 'no' branch exiting the loop and FIG. 7 processing thereafter ends (or returns to the calling routine) at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
    storing data type information about a set of sensitive data transmitted by a user device to a selected online site, wherein the data type information comprises a date that the set of sensitive data was sent to the selected online site, and a set of site information pertaining to the selected online site, wherein the set of site information includes an account deletion network address (URL), the data type information and the set of site information being stored in a data store accessible to the user device, and wherein the storing inhibits storage of the sensitive data in the data store;
    subsequent to the storing, managing the data type information and the set of site information by:
        displaying the site information;
        receiving, at the user device, a request to remove the user's sensitive data from the selected online site; and
        responsively transmitting a deletion request to the selected online site.

2. The method of claim 1 wherein the data store is stored on a network accessible storage device (a "cloud" storage device) that is accessed by the user's device via an online service, the method further comprising:

retrieving a plurality of data fields from the selected online site, wherein one or more of the data fields pertains to a different portion of the sensitive data;

determining the data type information based upon the retrieved data fields, wherein at least one of the data type information is selected from the group consisting of a user's name, a user's email address, a user's date of birth, a user's mailing address, a user's telephone number, a user's financial account number, a user's government identity number, and a user's gender; and identifying the set of sensitive data based on the determined data types.

3. The method of claim 2 further comprising:

detecting a transmission of the sensitive data from the user's device to the selected online site over a computer network;

submitting the plurality of data fields to a trained artificial intelligence (AI) system; and receiving a response from the trained AI system indicating which of the plurality of data fields are directed to the sensitive data and the data type information that corresponds to each of the data fields that are directed to the sensitive data.

4. The method of claim 1 further comprising:

retrieving a set of site information from the selected online site, wherein the retrieving includes retrieving one or more data policies from one or more pages included in the selected online site, wherein at least one of the data policies regards data retention and wherein at least one of the data policies regards data sharing.

5. The method of claim 1 further comprising:

retrieving the account deletion network address (URL) from the selected online site; and utilizing the retrieved account deletion URL to transmit the deletion request from the user's device to the selected online site.

6. The method of claim 5 further comprising:

after an amount of time has elapsed since the transmission of the deletion request to the selected online site, transmitting an account status request to the selected online site, wherein the amount of time is based on a time permitted for the selected online site to delete the user's sensitive data;

receiving an account status response from the selected online site; and in response to the account status response indicating that a user's account on the selected online site is still active, transmitting one or more messages to one or more online sites requesting that the user's sensitive data be deleted from the selected online site, wherein one of the online sites is the selected online site.

7. The method of claim 1 wherein the managing further comprises:

displaying a list of a plurality of online sites on the user device, wherein the plurality of online sites includes the selected online site;

receiving, from a user, a selection of the selected online site at the user device, wherein the selected online site is from a plurality of site information stored in the data store and displayed on a display of the user device, wherein each of the plurality of site information pertains to one of a plurality of online sites including the selected online site;

in response to the selection, retrieving, from the data store, the data types corresponding to the sensitive data that were transmitted to the selected online site and a set of data policies that were retrieved from the selected online site; and displaying, on the display, the selected online site information including the data types and the data policies, wherein the data policies are arranged in an easy-to-read format and notifies the user of any field-specific data policies.

8. An information handling system comprising:

one or more processors;

a memory coupled to at least one of the processors; and a set of computer program instructions stored in the memory and executed by at least one of the processors in order to perform actions comprising:

storing data type information about a set of sensitive data transmitted by a user device to a selected online site, wherein the data type information comprises a date that the set of sensitive data was sent to the online site, and a set of site information pertaining to the selected online site, wherein the set of site information includes an account deletion network address (URL), the data type information and the set of site information being stored in a data store accessible to the user device, and wherein the storing inhibits storage of the sensitive data in the data store;

subsequent to the storing, managing the data type information and the set of site information by:

displaying the site information;

receiving, at the user device, a request to remove the user's sensitive data from the selected online site; and responsively transmitting a deletion request to the selected online site.

9. The information handling system of claim 8 wherein the data store is stored on a network accessible storage device (a "cloud" storage device) that is accessed by the user's device via an online service, the actions further comprising:

retrieving a plurality of data fields from the selected online site, wherein one or more of the data fields pertains to a different portion of the sensitive data;

determining the data type information based upon the retrieved data fields, wherein at least one of the data type information is selected from the group consisting of a user's name, a user's email address, a user's date of birth, a user's mailing address, a user's telephone number, a user's financial account number, a user's government identity number, and a user's gender; and identifying the set of sensitive data based on the determined data types.

10. The information handling system of claim 9 wherein the actions further comprise:

detecting a transmission of the sensitive data from the user's device to the selected online site over a computer network;

submitting the plurality of data fields to a trained artificial intelligence (AI) system; and receiving a response from the trained AI system indicating which of the plurality of data fields are directed to the sensitive data and the data type information that corresponds to each of the data fields that are directed to the sensitive data.

11. The information handling system of claim 8 wherein the actions further comprise:

retrieving a set of site information from the selected online site, wherein the retrieving includes retrieving one or more data policies from one or more pages included in the selected online site, wherein at least one of the data policies regards data retention and wherein at least one of the data policies regards data sharing.

12. The information handling system of claim 8 wherein the actions further comprise:
retrieving the account deletion network address (URL) from the selected online site; and
utilizing the retrieved account deletion URL to transmit the deletion request from the user's device to the selected online site.

13. The information handling system of claim 12 wherein the actions further comprise:
after an amount of time has elapsed since the transmission of the deletion request to the selected online site, transmitting an account status request to the selected online site, wherein the amount of time is based on a time permitted for the selected online site to delete the user's sensitive data;
receiving an account status response from the selected online site; and
in response to the account status response indicating that a user's account on the selected online site is still active, transmitting one or more messages to one or more online sites requesting that the user's sensitive data be deleted from the selected online site, wherein one of the online sites is the selected online site.

14. The information handling system of claim 8 wherein the managing further comprises:
displaying a list of a plurality of online sites on the user device, wherein the plurality of online sites includes the selected online site;
receiving, from a user, a selection of the selected online site at the user device, wherein the selected online site is from a plurality of site information stored in the data store and displayed on a display of the user device, wherein each of the plurality of site information pertains to one of a plurality of online sites including the selected online site;
in response to the selection, retrieving, from the data store, the data types corresponding to the sensitive data that were transmitted to the selected online site and a set of data policies that were retrieved from the selected online site; and
displaying, on the display, the selected online site information including the data types and the data policies, wherein the data policies are arranged in an easy-to-read format and notifies the user of any field-specific data policies.

15. A computer program product stored in a computer readable storage medium, comprising computer program code that, when executed by an information handling system, performs actions comprising:
storing data type information about a set of sensitive data transmitted by a user device to a selected online site, wherein the data type information comprises a date that the set of sensitive data was sent to the selected online site and a set of site information pertaining to the selected online site, wherein the set of site information includes an account deletion network address (URL), the data type information and the set of site information being stored in a data store accessible to the user device, and wherein the storing inhibits storage of the sensitive data in the data store;
subsequent to the storing, managing the data type information and the set of site information by:
displaying the site information;
receiving, at the user device, a request to remove the user's sensitive data from the selected online site; and
responsively transmitting a deletion request to the selected online site.

16. The computer program product of claim 15 wherein the data store is stored on a network accessible storage device (a "cloud" storage device) that is accessed by the user's device via an online service, the actions further comprising:
retrieving a plurality of data fields from the selected online site, wherein one or more of the data fields pertains to a different portion of the sensitive data;
determining the data type information based upon the retrieved data fields, wherein at least one of the data type information is selected from the group consisting of a user's name, a user's email address, a user's date of birth, a user's mailing address, a user's telephone number, a user's financial account number, a user's government identity number, and a user's gender; and
identifying the set of sensitive data based on the determined data types.

17. The computer program product of claim 16 wherein the actions further comprise:
detecting a transmission of the sensitive data from the user's device to the selected online site over a computer network;
submitting the plurality of data fields to a trained artificial intelligence (AI) system; and
receiving a response from the trained AI system indicating which of the plurality of data fields are directed to the sensitive data and the data type information that corresponds to each of the data fields that are directed to the sensitive data.

18. The computer program product of claim 15 wherein the actions further comprise:
retrieving a set of site information from the selected online site, wherein the retrieving includes retrieving one or more data policies from one or more pages included in the selected online site, wherein at least one of the data policies regards data retention and wherein at least one of the data policies regards data sharing.

19. The computer program product of claim 15 wherein the actions further comprise:
retrieving the account deletion network address (URL) from the selected online site; and
utilizing the retrieved account deletion URL to transmit a deletion request from the user's device to the selected online site.

20. The computer program product of claim 19 wherein the actions further comprise:
after an amount of time has elapsed since the transmission of the deletion request to the selected online site, transmitting an account status request to the selected online site, wherein the amount of time is based on a time permitted for the selected online site to delete the user's sensitive data;
receiving an account status response from the selected online site; and
in response to the account status response indicating that a user's account on the selected online site is still active, transmitting one or more messages to one or more online sites requesting that the user's sensitive data be deleted from the selected online site, wherein one of the online sites is the selected online site.

\* \* \* \* \*